United States Patent
Tults et al.

(10) Patent No.: US 6,693,678 B1
(45) Date of Patent: Feb. 17, 2004

(54) DATA BUS DRIVER HAVING FIRST AND SECOND OPERATING MODES FOR COUPLING DATA TO THE BUS AT FIRST AND SECOND RATES

(75) Inventors: Juri Tults, Indianapolis, IN (US); William John Testin, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/581,780

(22) PCT Filed: Dec. 18, 1997

(86) PCT No.: PCT/US97/23364
§ 371 (c)(1),
(2), (4) Date: Nov. 9, 2000

(87) PCT Pub. No.: WO99/31598
PCT Pub. Date: Jun. 24, 1999

(51) Int. Cl.[7] .................................................. H04N 5/14
(52) U.S. Cl. ...................... 348/571; 348/720; 348/901; 710/110; 710/14
(58) Field of Search ................................. 348/571, 720, 348/725, 901; 710/14, 60, 110; H04N 5/14, 5/44, 9/64

(56) References Cited

U.S. PATENT DOCUMENTS

| | | | |
|---|---|---|---|
| 5,305,443 A | * | 4/1994 | Franzo ........................ 710/110 |
| 5,513,334 A | | 4/1996 | Alexander |
| 5,619,147 A | * | 4/1997 | Hunley ......................... 326/26 |
| 5,657,482 A | | 8/1997 | Klein |
| 5,758,098 A | * | 5/1998 | Townsley et al. ............ 710/110 |
| 5,819,051 A | * | 10/1998 | Murray et al. ............... 710/110 |
| 5,970,255 A | * | 10/1999 | Tran et al. ..................... 710/14 |
| 6,351,489 B1 | * | 2/2002 | Tetzlaff ....................... 375/238 |
| 6,388,467 B1 | * | 5/2002 | Ward et al. .................... 326/56 |
| 6,557,063 B1 | * | 4/2003 | Wang et al. ................. 710/110 |

FOREIGN PATENT DOCUMENTS

| | | | |
|---|---|---|---|
| EP | 359233 | 3/1990 | ........... G06F/13/42 |
| GB | 2252432 | 8/1992 | ........... G06F/13/42 |

OTHER PUBLICATIONS

European Search Report dated May 6, 1998.

\* cited by examiner

*Primary Examiner*—Sherrie Hsia
(74) *Attorney, Agent, or Firm*—Joseph S. Tripoli; Paul P. Kiel

(57) ABSTRACT

Information is coupled to a data bus such as an I$^2$C data bus using a push-pull circuit. The push-pull circuit provides for communicating on the data bus at two different data rates. The push-pull circuit includes an active pull-up device that is enabled during a first push-pull mode of operation for providing a high data rate. During a second normal mode of operation, the active pull-up device is disabled providing a low data rate. When the active pull-up device is deactivated, the clock and data buses are driven by the external resistors connected thereto at a data rate lower than the data rate during the first mode.

10 Claims, 5 Drawing Sheets

SCL DRIVE

SDA DRIVE

SDA

DATA BUS DRIVER HAVING FIRST AND SECOND OPERATING MODES FOR COUPLING DATA TO THE BUS AT FIRST AND SECOND RATES

FIELD OF THE INVENTION

The present invention involves digital data bus systems.

BACKGROUND

Systems such as consumer electronics systems typically include various devices, such as integrated circuits, that are coupled together using a data bus for communicating information between the devices. An example of this type of system is a television receiver which includes an I²C serial data bus for communicating tuning data from a control microprocessor to a tuner causing the tuner to tune a particular channel. An I²C data bus is a well known serial data bus comprising two bus lines, a clock line designated SCL and a serial data line designated SDA, that carry information between devices connected to the bus. Each device is assigned a unique address permitting communications on the bus to be directed to a particular device. Each device can transmit data, receive data, or both as required by the function of the device. In addition to transmitting and receiving data, each device can also function as a master or slave when performing data transfers. A master is the device which initiates a data transfer on the bus and generates the clock signals to permit that transfer. At that time, any device addressed is considered a slave.

The I²C bus is a multi-master bus, meaning that more than one device is capable of controlling the bus. Masters are usually control devices such as microprocessors, microcomputers, or microcontrollers (also referred to herein as "controllers"). The possibility of connecting more than one microcontroller to the bus means that more than one master can try to initiate a data transfer at the same time on the bus. A procedure known as arbitration favorably resolves such an event. Arbitration relies on the wired-AND connection of all I²C interfaces to the bus. Should two or more masters try to place information on the bus, the first one to produce a logic one when the other produces a logic zero will lose the arbitration. The clock signals during arbitration are a synchronized combination of the clocks generated by the masters using the wired-AND connection to the SCL line. The specification for the I²C bus protocol specifies that the output stages of devices connected to the bus are to have an open-drain or open-collector in order to perform the wired-AND function. Consequently, pull-up of the bus lines is usually accomplished through pull-up resistors connected between the bus lines and a source of supply voltage.

Generation of clock signals on the I²C bus is always the responsibility of the master devices. Each master generates its own clock signal when transferring data on the bus. Data is only valid during the logic high period of the clock. Bus clock signals from a master can only be altered by another master when arbitration occurs or when the clock signals are stretched by a slow-slave device holding down the clock line. For example every byte of information put on the SDA line (i.e., 8 bits of information) must be followed by an acknowledge bit. An acknowledge-related clock pulse is generated by the master. During the acknowledge clock pulse, the transmitter releases the SDA line and the receiver must pull down the SDA line. A receiving device can delay receipt of another byte of data, e.g., until it has performed some other function such as servicing an interrupt, by holding the SCL clock line low which will force the transmitting device into a wait state. U.S. Pat. No. 4,689,740 issued to Adrianus P. M. M. Moelands and Herman Schutte details the operation of the I²C bus and protocol.

SUMMARY OF THE INVENTION

The invention resides, in part, in recognizing that while the relative simplicity and availability of numerous compatible devices make a bus protocol such as I²C desirable, the form of bus driver associated with the bus protocol may not be adequate for certain applications. For example, bus drivers used with an I²C bus system typically use an open collector (or drain) device with a pull-up resistor coupled between the bus line and a source of reference voltage. Capacitive loading of a bus line combined with the resistance of a pull-up resistor may significantly degrade the speed at which a bus line can be pulled up. Further, capacitive loading increases with the number of devices coupled to the bus. This can pose a problem for applications that require high speed and involve high capacitive loads such as during production testing of a device incorporating bus driver capability (note that the term "device" as used herein includes integrated circuits and apparatus such as television receivers). Furthermore, the master has numerous other tasks to perform besides communicating with the slave devices. Therefore, a need exists for a bus driver suitable for driving buses such as an I²C bus with large loads at high speed to perform the communication between master and slave devices as fast as possible.

In addition, the inventor has recognized that utilizing a modified form of bus driver that can drive large loads at high speeds may be incompatible with existing bus compatible devices. In particular, existing I²C compatible devices are designed with current sinking capability sufficient only to pull down a bus line held high by a pull-up resistor (e.g., during an acknowledge interval or to cause a wait state). Such current sinking capability may be inadequate to pull down a bus line driven by a high speed driver circuit.

Also, the inventor has recognized that while it may be desirable to communicate data at high data rates across a heavily loaded bus, doing so may produce undesirable noise effects. Driving data across a data bus at high data rates involves using fast signal edges that have high frequency harmonic components. For example, in a television system, these high frequency harmonics can introduce noise into the video signal processing channel and may cause undesirable noise effects in a displayed video image.

The invention also resides, in part, in providing an apparatus for coupling data to a data bus that solves the described problems. More specifically, apparatus constructed in accordance with one aspect of the invention comprises a data bus, a passive device for changing a signal on the data bus between first and second states at a first rate during a first mode of operation, and an active device enabled during a second mode of operation for changing the signal between the first and second states at a second rate different than the first rate. The second mode of operation may correspond to a particular condition of the bus such as an acknowledge condition or a data read condition.

In accordance with another aspect of the invention, information generated by a device is coupled to an I²C data bus via a push-pull device. Another aspect of the invention involves the push-pull device having first and second modes of operation. During the first mode of operation, the push-pull device couples information to the I²C data bus at a first rate. During the second mode of operation, the push-pull device couples information to the I²C data bus at a second rate.

In accordance with another aspect of the invention, the apparatus comprises a coupling device for coupling data to a data bus and a timing signal generator for generating a timing signal indicating first and second portions of a television signal. The coupling device is controlled by a control device in response to the timing signal such that the coupling device couples data to the data bus at a first rate during the first portion of the television signal and couples data to the data bus at a second rate during the second portion of the television signal. The first portion of the television signal may comprise an active video interval while the second portion of the television signal may comprise a blanking interval. The first rate at which data is coupled to the data bus may be less than the second rate at which data is coupled to the data bus. A push-pull device included in the coupling device can be disabled during the first portion of the television signal and enabled for driving data onto the data bus at the second rate during the second portion of the television signal.

BRIEF DESCRIPTION OF THE DRAWING

The invention may be better understood by referring to the drawing in which.

DETAILED DESCRIPTION

Figure 1:
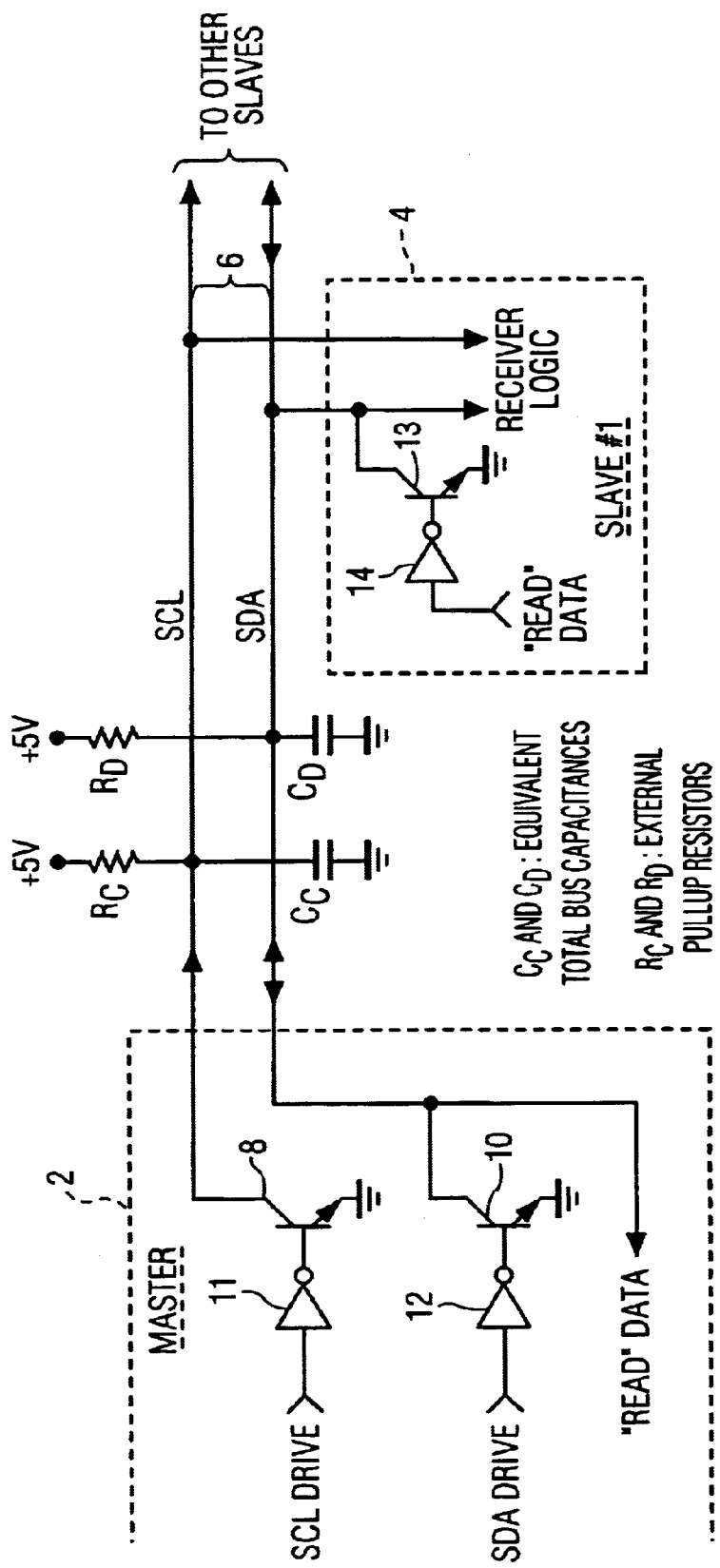
FIG. 1 shows, in schematic diagram form, an arrangement of master and slave devices communicating via a data bus.
Figure 2A:
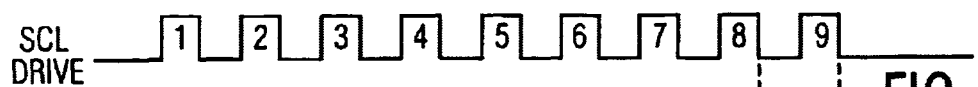
FIGS. 2A–2D show timing diagrams illustrating the operation of the system shown in FIG. 1.
Figure 2B:
Figure 2C:
Figure 2D:
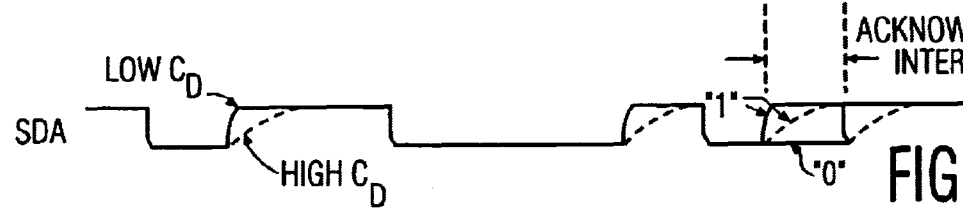

In a conventional data bus system such as the I$^2$C bus system shown in FIG. 1, master device 2 is connected to slave device 4 (designated Slave #1) by I$^2$C bus 6. In accordance with I$^2$C bus conventions, the labels SDA and SCL are used to identify the serial data line and the clock line, respectively, in I$^2$C bus embodiments described herein and shown in the accompanying Figures. Master device 2 comprises a driver for driving each bus line. More specifically, bus lines SCL and SDA in FIG. 1 are driven using NPN bipolar transistors 8 and 10, respectively, connected thereto.

The base of each transistor, 8 and 10, is connected to an output of a respective one of inverters 11, 12. A respective drive signal, SCL DRIVE and SDA DRIVE, is coupled to the input of a corresponding inverter 11, 12. When SCL DRIVE or SDA DRIVE signals are at a logic high level, the respective NPN transistors 8 or 10 do not turn on causing lines SCL and SDA to be pulled to a high level, e.g., to 5 volts in FIG. 1, via pull-up resistors $R_C$ and $R_D$, respectively. When SCL DRIVE or SDA DRIVE signals are at a logic low level, the respective NPN transistors 8 or 10 turn on to pull their respective bus lines down to a low level, e.g., circuit ground in FIG. 1.

Slave device 4 includes a pull-down device, implemented in FIG. 1 as NPN bipolar transistor 13 having a base terminal that is connected to the output of inverter 14. Transistor 13 pulls down the SDA line upon receipt of a logic high signal at its base. The input of inverter 14 is coupled to receive signal "Read data". Pull-down of the SDA line by transistor 13 occurs when data is being read out from slave device 4, e.g., "Read data" input is switched between high and low. Data received by slave device 4 from the SCL and SDA bus lines is coupled to receiver logic that processes the data.

The SCL line pull-up resistor is designated $R_C$ and the SDA line pull-up resistor is designated $R_D$. Each pull-up resistor is shown connected at one end to an exemplary 5 volt supply voltage and to a respective capacitor, $C_C$ or $C_D$, representative of the lumped equivalent capacitances of a respective bus line. The SDA and SCL bus lines are also connected to other slave devices as indicated in FIG. 1. The SDA line is bidirectional while the SCL line is an output only from the master device generating the clock signal, i.e., device 2 in FIG. 1.

FIGS. 2A–2D illustrate relative timing diagrams of the SCL DRIVE signal, the signal present on the SCL line, the SDA DRIVE signal and the signal present on the SDA line, respectively. The SCL DRIVE and SDA DRIVE signals are the driving signals coupled to the SCL and SDA bus lines, respectively, by a coupling device such as bus driver devices 8, 11 and 10, 12 in FIG. 1. A nine bit transmission, including an acknowledge bit, is illustrated in FIGS. 2A–2D by the waveforms for signals SCL DRIVE, SCL, SDA DRIVE and SDA. A solid-line portion of the waveform for signal SCL is labeled "low $C_C$" and shows the signal waveform on the SCL line resulting from low capacitance loading on the SCL line. The dashed portion of the SCL waveform, labeled "high $C_C$", indicates the signal waveform on the SCL line resulting from a high capacitance load on the SCL line. Similarly illustrated is a low capacitance loaded SDA line (the solid line portion of the SDA waveform is labeled "low $C_D$") and a high capacitance loaded SDA line (the dashed line portion of the SDA waveform is designated "high $C_D$"). The data state (logic 0 and 1) during the acknowledge interval (signified by generation of the acknowledge clock pulse by the master, release of the SDA line by the transmitter and pull-down of the SDA line by the receiver during the acknowledge clock pulse) is also illustrated in FIGS. 2A–2D.

Figure 3:
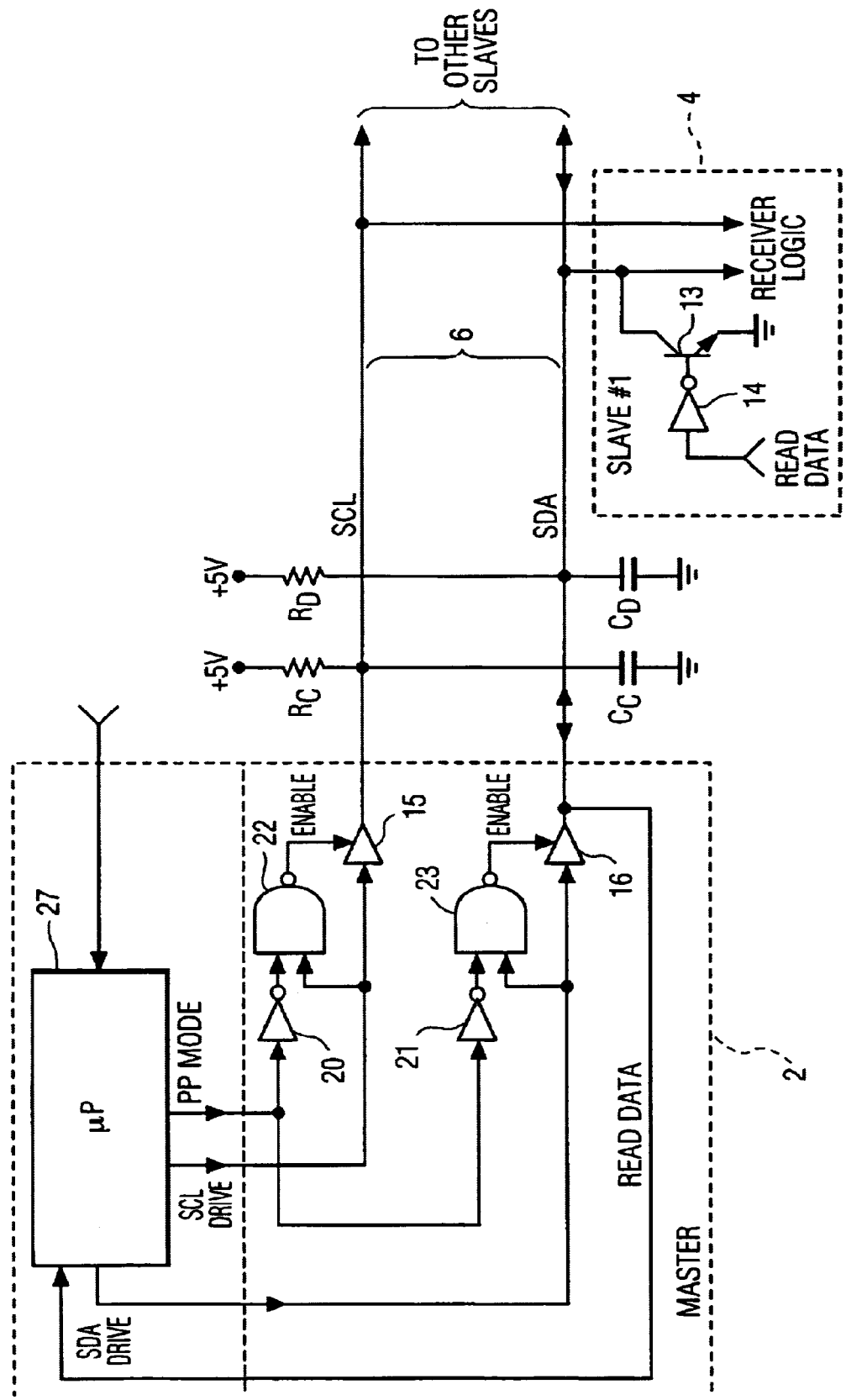
FIG. 3 shows, in schematic diagram form, an embodiment of a data bus communication system for communicating data between master and slave devices in accordance with the present invention.

FIG. 3 illustrates the apparatus for driving a data bus in accordance with principles of the present invention. To provide for higher data rates on heavily loaded bus lines, for example, to allow for high speed production testing, FIG. 3 illustrates a system for decreasing slow rise times associated with high capacitance loading on a bus line. In particular, the bus driver within master device 2 includes buffer devices 15 and 16 which provide active pull-up and pull-down of the bus lines. More specifically, tri-state buffers 15 and 16 drive respective bus lines SCL and SDA in a high speed mode which shall be referred to as a push-pull mode. Operation of the bus in the conventional manner (e.g., in a low speed mode via the passive pull-up resistors) is still possible. However, in the push-pull mode, the tri-state buffers 15 and 16 are always in an active state and the bus lines are driven to a logic high level much faster, in comparison with the conventional mode, through the relatively large source currents furnished by the tri-state buffers.

Figure 4:
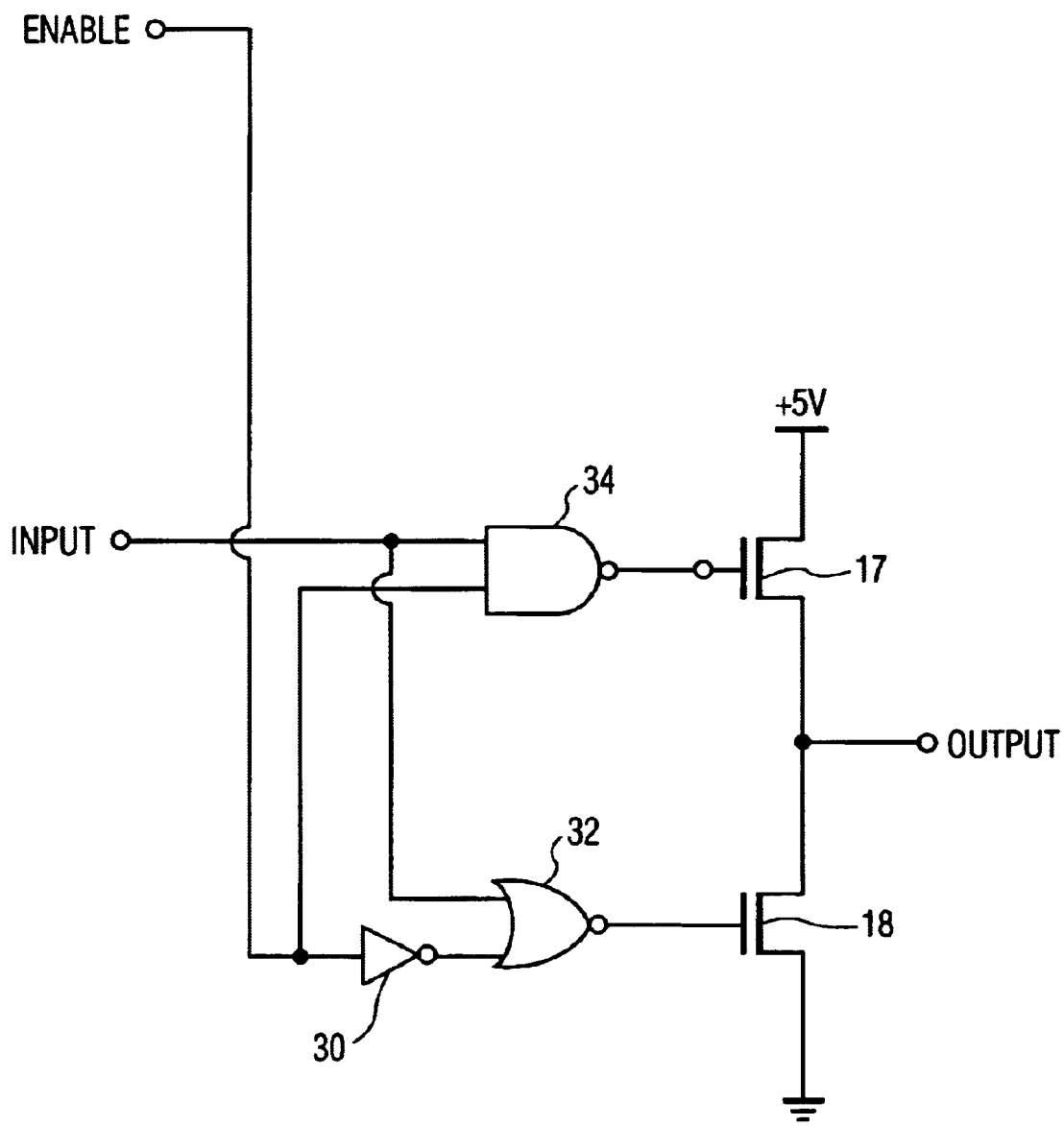
FIG. 4 shows, in schematic diagram form, an embodiment of a portion of the system shown in FIG. 3.
Figure 5A:
FIGS. 5A–5D show timing diagrams illustrating the operation of the system shown in FIG. 3.
Figure 5B:
Figure 5C:
Figure 5D:
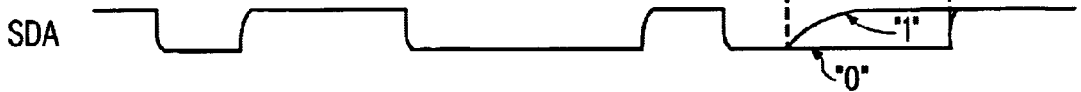

Tri-state buffers such as buffers 15 and 16 in FIG. 3 can be implemented as shown in FIG. 4. Although FIG. 4 shows an embodiment using field effect transistors, various technologies including bipolar and field effect transistors can be used to implement the drivers shown. In FIG. 4, the drain terminals of PMOS transistor 17 and NMOS transistor 18 are coupled together. The source terminal of transistor 17 is coupled to a supply voltage, e.g., 5 V, and the source terminal of transistor 18 is coupled to a reference potential, e.g., ground. The gate terminal of transistor 17 is coupled to the output of NAND gate 34 which has as inputs signal INPUT which is the data that is to be driven onto the bus, and signal ENABLE. The gate terminal of transistor 18 is coupled to the output of NOR gate 32 which has as inputs signal INPUT and an inverted version of signal ENABLE (inverted via inverter 30). When signal ENABLE is high (at logic 1), the buffer is enabled for transmitting data. Specifically, when enabled, logic 0 values on signal INPUT are passed through NOR gate 32 and transistor 18 onto the bus (signal OUTPUT) while logic 1 values on signal INPUT are passed through NAND gate 34 and transistor 17 onto the bus.

Returning to FIG. 3, signal PP MODE (push-pull mode) is generated by a microprocessor 27. The microprocessor 27 decides whether to generate either a high or low logic level PP mode signal which determines whether the master 2 is operating in a push-pull or normal mode. Signal PP MODE is coupled to one input of NAND gate 22 via inverter 20. Signal SCL DRIVE is also generated by microprocessor 27 and coupled to the other input of NAND gate 22. The output of NAND gate 22 provides the ENABLE signal for tri-state buffer 15 such that buffer 15 is always enabled when signal PP MODE is at a logic high level. The SCL bus line is pulled up to a logic high level by the active device in tri-state buffer 15 in connection with a logic high SCL DRIVE signal while tri-state buffer 15 is enabled, a first state. The SCL bus line is pulled down to a logic low level by tri-state buffer 15 in connection with a logic low SCL DRIVE signal while tri-state buffer 15 is enabled, a second state. Tri state buffer 15 is always enabled to drive the SCL bus line and change line SCL between the first and second signal states (high and low logic levels) when signal PP MODE is at a logic high level.

In order to use the push-pull mode for achieving a logic high level on bus line SDA, the master 2 must not be either reading data from the addressed slave or generating an SCL clock pulse for the acknowledge bit generated by the slave. Signal PP MODE is also coupled to one input of NAND gate 23 via inverter 21. Signal SDA DRIVE is also generated by microprocessor 27 and coupled to the other input of NAND gate 23. The output of NAND gate 23 provides the enable signal for tri-state buffer 16 such that buffer 16 is always enabled when signal PP MODE is at a logic high level. The SDA bus line is pulled up to a logic high level by the active device included in tri-state buffer 16 in connection with a logic high SDA DRIVE signal while SDA bus line is pulled down to a logic low level by tri-state buffer 16 in connection with a logic low SDA DRIVE signal while tri-state buffer 16 is enabled.

When the master 2 is in a read cycle or during an acknowledge interval the microprocessor 27 will generate a logic low PP MODE signal and the buffers 15 and 16 will be disabled when the SCL and SDA DRIVE signals, respectively, are at a logic high level. In this instance the SCL and SDA buses are operating in a normal mode pulled high by the external resistors $R_C$ and $R_D$, respectively. During these times the microprocessor 27 will generate a logic low level PP MODE signal. Thus, in normal operation, signal PP MODE is a logic low control bit and the tri-state buffers driving the I²C bus are in a high output impedance state during intervals when the SCL DRIVE and SDA DRIVE signals are at a logic high level. In other words, the push-pull mode is turned off when SCL DRIVE and SDA DRIVE are at logic "1". The logic high level on the bus lines is established through pull-up resistors $R_C$ and $R_D$ when signal PP MODE is at logic "0". That is, the passive pull up resistors change the signals on the bus lines between the first and second states (logic low and high levels) at a rate determined by the pull up resistor value and the capacitive loading on the bus lines.

FIGS. 5A–5D illustrate the relative timing diagrams of selected signals on the bus illustrated in FIG. 3. Now the wave form shapes associated with the push-pull mode all follow the low capacitive loaded form indicated by the solid line. Note that the push-pull mode of master cell device 2 must be suspended while master 2 is reading data supplied by a slave cell 4. This is necessary because in general the slaves on the bus cannot be expected to have push-pull bus drive capability. In fact, note that the acknowledge interval shown in FIGS. 2A–2D are the result of slave device 4 either releasing or holding low the SDA bus line. When the slave devices return data, the master must have released the SDA bus line so that this bus line can be pulled low by a slave. Further, the, SCL bus clock must be slowed down during the read period to allow for the slow rise time of the returned data signal on the SDA bus.

As shown in FIGS. 5A–5D, during the acknowledge interval corresponding to the 9th SCL clock cycle in which the addressed slave device returns a bit of data to the master, the master is switched from push-pull to normal drive. The clock period is shown to be increased arbitrarily by a factor of 2 in the acknowledge interval. Control of the clock period is provided by software executed by microprocessor 27. When the slave is returning either read data or an acknowledge bit (either a logic high or logic low during the ninth clock pulse) the slave is placing data on the bus by pulling down the SDA bus line or by allowing pulling up the SDA bus line by the pull-up resistor. The purpose of increasing the clock period of the pulse on the SCL bus line when the slave is returning data is to accommodate the fact that the slave is not able to operate in the push-pull mode. A purely slave device (defined herein as a slave that does not have provision for acting as a master) never pulls up the bus by a push-pull mode. However, note that as another embodiment of the invention, it is possible to implement bus control through push-pull mode using a master acting as a slave.

Although the invention has been described in detail herein with reference to its preferred embodiment, it is to be understood that this description is by way of example only and it is not to be construed in a limiting sense. It is to be further understood that numerous changes in the details of the embodiments of the invention, and additional embodiments of the invention, will be apparent to, and may be made by persons of ordinary skill in the art having reference to this description. For example, although described with regard to an embodiment incorporating a data bus according to the I²C protocol, the invention is applicable to other data bus protocols incorporating either serial or parallel data communication. An example of another data bus protocol for which the invention may be useful is the IM data bus protocol supported by ITT.

Also, although conventional slave devices do not include push-pull mode operation, purely slave devices may be manufactured by device makers, in consideration of the invention disclosed herein, which incorporate the tri-state buffer as is similarly included in the master device as discussed above. In addition, although specific logic control signal polarities and circuit implementations have been described, it will be appreciated by those of ordinary skill in the art that modifications can be made to the structure and function of the invention without departing from the spirit and scope thereof and it is contemplated that all such changes and additional embodiments are within the true scope and spirit of the invention as claimed below.

What is claimed is:

1. An apparatus for controlling data transmission on a data bus, said apparatus comprising:
   a passive device coupled to the data bus for establishing a first operating mode during which data signals are transmitted on the data bus at a first rate; and
   an active device coupled to the data bus and capable of operating in one of an enabled mode and a disabled mode, said active device in said enabled mode establishing a second operating mode during which signals are transmitted on the data bus at a second rate, said first rate being different from said second rate.

2. The apparatus of claim 1, wherein said data bus is an I$^2$C data bus.

3. The apparatus of claim 2, wherein said passive device includes a pull-up resistor for coupling the data bus to a voltage source and said active device includes a push-pull device coupled between the data bus and the voltage source.

4. The apparatus of claim 3, wherein the data is transmitted between a master device and a slave device and said push-pull device couples the master device to the data bus.

5. The apparatus of claim 1, wherein said active device is disabled during said first mode of operation, thereby preventing said active device from affecting said first rate.

6. The apparatus of claim 5, wherein said passive device is operative during said first and second modes of operation for switching a signal on the data bus between logic high and logic low states.

7. The apparatus for claim 5, wherein the data is transmitted between a master device and a slave device, and said active device comprises a push-pull device, said push-pull device couples the master device to the data bus and said first operating mode corresponds to one of an acknowledge condition or a data read condition during which said slave device communicates information to the master device.

8. The apparatus of claim 7, wherein said date bus is an I$^2$C data bus.

9. A television signal processing system including an apparatus for controlling data transmission on a data bus, said apparatus comprising:
   a passive device coupled to the data bus for establishing a first operating mode during which data signals are transmitted on the data bus at a first rate; and
   an active device coupled to the data bus and capable of operating in one of an enabled mode and a disabled mode in response to a control signal, said active device in said enabled mode establishing a second operating mode during which signals are transmitted on the data bus at a second rate, said first rate being different from said second rate, wherein said first operating mode occurs during an interval corresponding to a first portion of a television signal representing video information and said second operating mode occurs during an interval corresponding to a second portion of the television signal representing information other than video information.

10. The apparatus of claim 9, wherein said data bus is an I$^2$C data bus, the data is transmitted between a master device and a slave device, said active device includes a push-pull device coupling the master device to the data bus, said active device being disabled during said first operating mode thereby preventing said active device from affecting said first rate, and said first operating mode corresponds to one of an acknowledge condition or a data read condition during which said slave device communicates information to the master device.

* * * * *